(12) United States Patent
Okazaki et al.

(10) Patent No.: US 7,399,548 B2
(45) Date of Patent: Jul. 15, 2008

(54) FUEL CELL STACK

(75) Inventors: Koji Okazaki, Shiki (JP); Hiroshi Umeno, Saitama (JP); Tsutomu Hatsugai, Asaka (JP); Shigeru Toda, Kiryu (JP)

(73) Assignee: Honda Motor Co., Ltd., Tokyo (JP)

( * ) Notice: Subject to any disclaimer, the term of this patent is extended or adjusted under 35 U.S.C. 154(b) by 483 days.

(21) Appl. No.: 10/829,852

(22) Filed: Apr. 21, 2004

(65) Prior Publication Data

US 2004/0209140 A1   Oct. 21, 2004

(30) Foreign Application Priority Data

Apr. 21, 2003   (JP) ............... 2003-116227

(51) Int. Cl.
H01M 2/18   (2006.01)
(52) U.S. Cl. ............... 429/38; 429/34; 429/35; 429/38
(58) Field of Classification Search ............ None
See application file for complete search history.

(56) References Cited

U.S. PATENT DOCUMENTS

| | | | |
|---|---|---|---|
| 5,470,671 A * | 11/1995 | Fletcher et al. | 429/26 |
| 5,571,630 A * | 11/1996 | Cheiky | 429/26 |
| 5,879,826 A | 3/1999 | Lehman et al. | |
| 6,316,137 B1 * | 11/2001 | Kralick | 429/34 |
| 2004/0197620 A1 * | 10/2004 | Arthur | 429/22 |

FOREIGN PATENT DOCUMENTS

| | | |
|---|---|---|
| JP | 58-178964 | 10/1983 |
| JP | 61-188258 | 11/1986 |
| JP | 62-211869 | 9/1987 |
| JP | 63-276878 | 11/1988 |
| JP | 10-223238 | 8/1998 |
| JP | 2002-1844447 | 6/2002 |

OTHER PUBLICATIONS

Japanese Office Action for Application No. 2003-116227, dated Jan. 8, 2008.

* cited by examiner

*Primary Examiner*—Patrick Ryan
*Assistant Examiner*—Cynthia Lee
(74) *Attorney, Agent, or Firm*—Lahive & Cockfield, LLP; Anthony A. Laurentano, Esq.

(57) ABSTRACT

A fuel cell stack includes a first separator and a second separator. A reactant air flow channel is formed on one surface of the second separator. A fuel gas flow channel is formed on one surface of the first separator. Further, a coolant air flow channel is formed on the first separator, on the other surface opposite to the fuel gas flow channel. The reactant air flow channel is connected between a reactant air inlet and a reactant air outlet. A coolant air flow channel is connected between a coolant air inlet and a coolant air outlet. The reactant air flow channel and the coolant air flow channel are configured such that the pressure loss of the reactant air between the reactant air inlet and the reactant air outlet and the pressure loss of the coolant air between the coolant air inlet and the coolant air outlet are substantially the same.

7 Claims, 16 Drawing Sheets

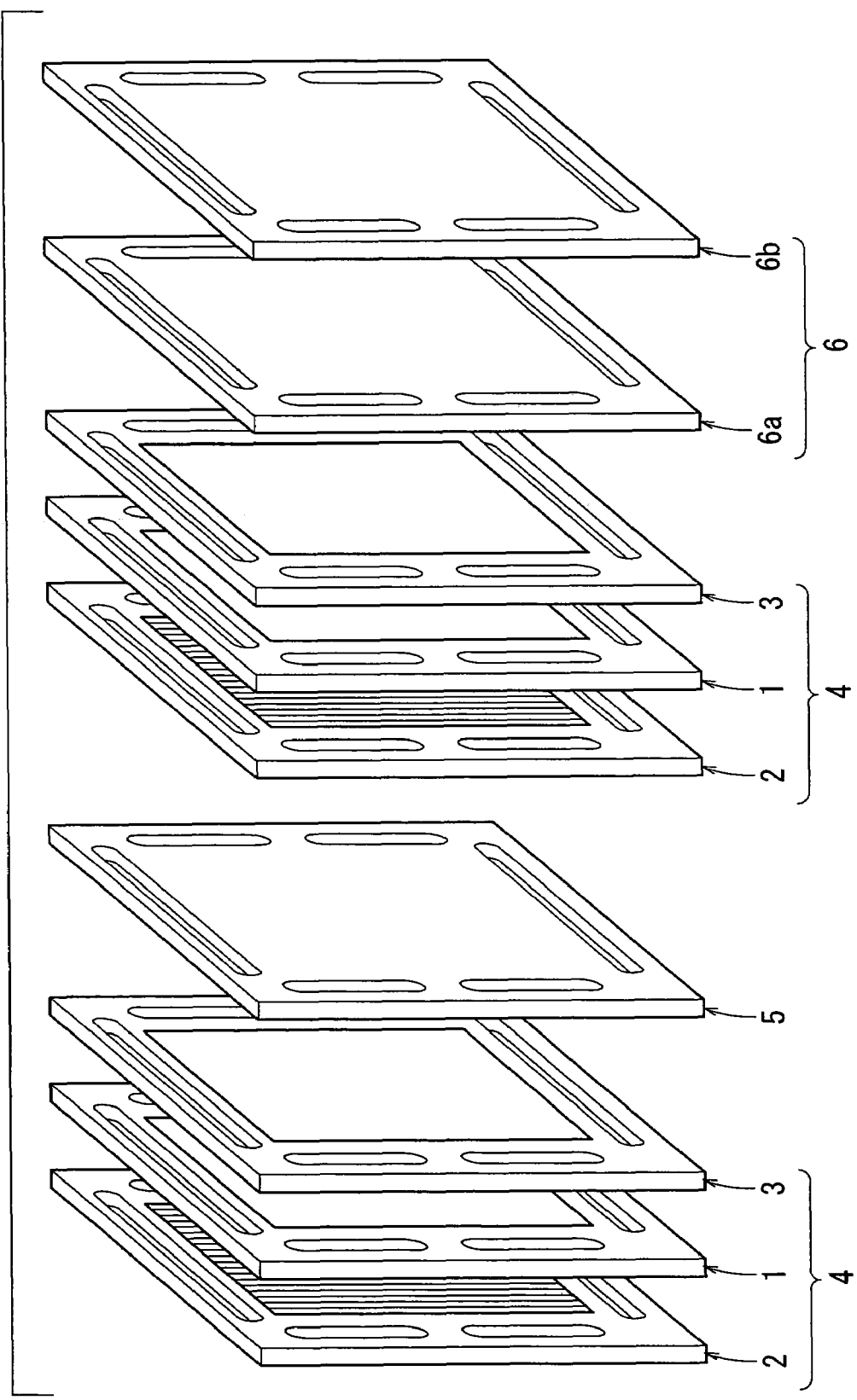

FUEL CELL STACK

BACKGROUND OF THE INVENTION

1. Field of the Invention

The present invention relates to a fuel cell stack formed by stacking a plurality of power generation cells. Each of the power generation cells includes a membrane electrode assembly sandwiched between separators. The membrane electrode assembly includes an anode, a cathode, and a solid polymer electrolyte membrane interposed between the anode and the cathode.

2. Description of the Related Art

For example, a solid polymer electrolyte fuel cell employs a membrane electrode assembly (MEA) which includes two electrodes (anode and cathode), and an electrolyte membrane interposed between the electrodes. Each of the electrodes comprises an electrode catalyst layer of noble metal supported on a carbon base material. The electrolyte membrane is a polymer ion exchange membrane. The membrane electrode assembly is sandwiched between separators to form a unit of fuel cell (power generation cell).

In the fuel cell, a fuel gas such as a gas chiefly containing hydrogen (hydrogen-containing gas) is supplied to the anode. The catalyst of the anode induces a chemical reaction of the fuel gas to split the hydrogen molecule into hydrogen ions (protons) and electrons. The hydrogen ions move toward the cathode through the electrolyte, and the electrons flow through an external circuit to the cathode, creating a DC electric current. A gas chiefly containing oxygen (oxygen-containing gas) or air is supplied to the cathode. At the cathode, the hydrogen ions from the anode combine with the electrons and oxygen to produce water.

Typically, a predetermined number of fuel cells are stacked together to achieve the desired level of power output. The system of operating the fuel cell stack includes auxiliary devices (peripheral devices) such as a compressor or a blower for supplying an oxygen-containing gas such as air, a humidifier for humidifying reactant gases (air and fuel gas) and a temperature controller for maintaining the desired operating temperature.

It is preferable that the system for operating the fuel cell stack is small and compact. Therefore, the number of auxiliary devices should be reduced, and the power consumption by the auxiliary devices should also be reduced. In an attempt to improve the power efficiency, for example, the U.S. Pat. No. 5,879,826 discloses a fuel cell stack which is directed to maintain the sufficient air flow for removing the water produced in the fuel cell stack from the air channels, and reduce the power consumption for supplying the air to the fuel cell stack.

The fuel cell stack disclosed in the U.S. Pat. No. 5,879,826 is shown in FIG. 16. The fuel cell stack includes unit cells 4. Each of the unit cells 4 includes an MEA 1 sandwiched between an air frame (cathode separator) 2 and a hydrogen frame (anode separator) 3. A separator 5 is interposed between the unit cells 4. A repeating unit includes the unit cells 4, the separator 5, and cooling separators 6 (left cooling separator 6a and right cooling separator 6b).

In operating the fuel cell stack, different kinds of fluids, i.e., a fuel gas such as a hydrogen gas, an oxygen-containing gas such as air and a medium for regulating the temperature are supplied from the outside to the fuel cell stack. Therefore, dedicated auxiliary devices for regulating the flow-rate and the pressure are required for each of these three fluids. These auxiliary devices are operated by using the electrical energy produced in the fuel cell stack.

Since auxiliary devices are required for each of the three different fluids, the overall system is large, and the cost for producing the fuel cell system is high. The power consumption in the auxiliary devices, namely, the loss of the electrical energy produced in the fuel cell stack is significantly large. Consequently, the power generation efficiency of the fuel cell stack is low.

SUMMARY OF THE INVENTION

A main object of the present invention is to provide a compact fuel cell stack which can be produced or operated at low cost, and in which the number of auxiliary devices is small, and the power generation can be carried out efficiently.

According to the present invention, a fuel cell stack is formed by tightening a plurality of power generation cells together in a stacking direction. Each of the power generation cells comprises a membrane electrode assembly including an anode, and a cathode, and a solid polymer electrolyte membrane interposed between the anode and the cathode; separators sandwiching the membrane electrode assembly; a fuel gas flow channel for supplying a fuel gas to the anode; a reactant air flow channel for supplying a reactant air to the cathode; and a coolant air flow channel for supplying a coolant air to the membrane electrode assembly.

The reactant air flow channel includes a groove between a reactant air inlet and a reactant air outlet for supplying the reactant air to flow along a surface of the cathode. The coolant air flow channel includes a groove between a coolant air inlet and a coolant air outlet for supplying the coolant air to flow along a surface of one of the separators. The groove of the reactant air flow channel and the groove of the coolant air flow channel are configured such that pressure loss of the reactant air between the reactant air inlet and the reactant air outlet and pressure loss of the coolant air between the coolant air inlet and the coolant air outlet are substantially the same.

The pressure of the reactant air supplied to the reactant air flow channel and the pressure of the coolant air supplied to the coolant air flow channel are substantially the same. Thus, a common auxiliary device can be used for supplying the air to both of the reactant air flow channel and the coolant air flow channel. Consequently, the number of auxiliary devices is reduced. The system including the fuel cell stack is small, and produced or operated at low cost. The power consumption of the auxiliary device can be reduced effectively, and the power generation of the fuel cell stack can be carried out efficiently.

An air supply passage extends through the plurality of power generation cells in the stacking direction, and the air supply passage is connected to the reactant air inlet and the coolant air inlet. Thus, the number of auxiliary devices is further reduced, and the members used for the air supply passage can be simplified. Consequently, the system including the fuel cell stack is small, and the system can be produced or operated at low cost. The fuel cell stack itself is small.

The reactant air outlet and the coolant air outlet are positioned at side portion of the power generation cell, and exposed to the outside. Thus, the air can be supplied at low pressure to the reactant air inlet and the coolant air inlet which are positioned opposite to the reactant air outlet and the coolant air outlet. Therefore, the power consumption of the auxiliary device can be reduced, and the power generation efficiency of the fuel cell stack can be improved.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 16 is an exploded perspective view showing a conventional fuel cell.

DESCRIPTION OF THE PREFERRED EMBODIMENTS

Figure 1:
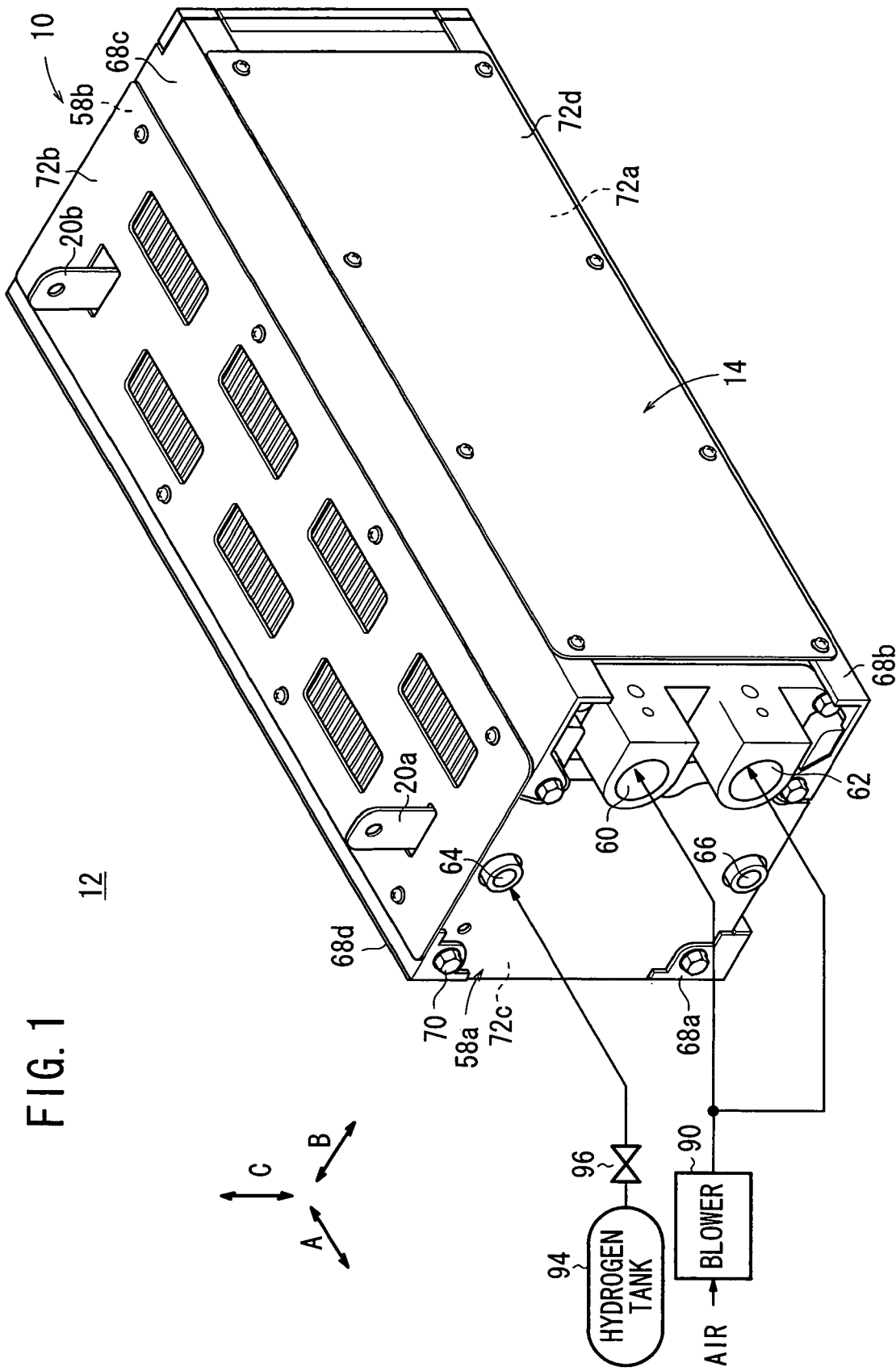
FIG. 1 is a perspective view schematically showing a fuel cell system including a fuel cell stack according to a first embodiment of the present invention.
Figure 2:
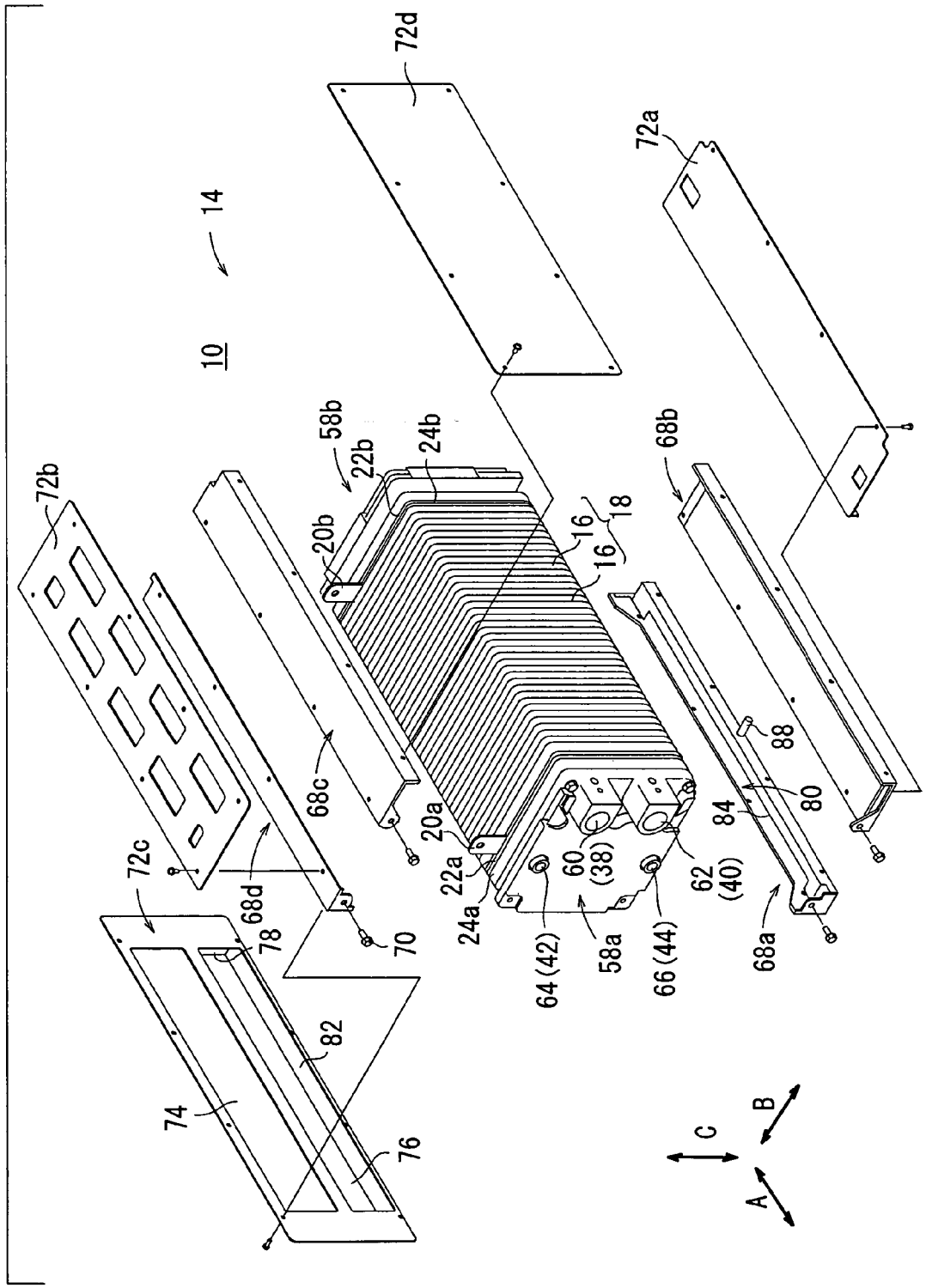
FIG. 2 is an exploded perspective view schematically showing a casing for covering the fuel cell stack.
Figure 3:
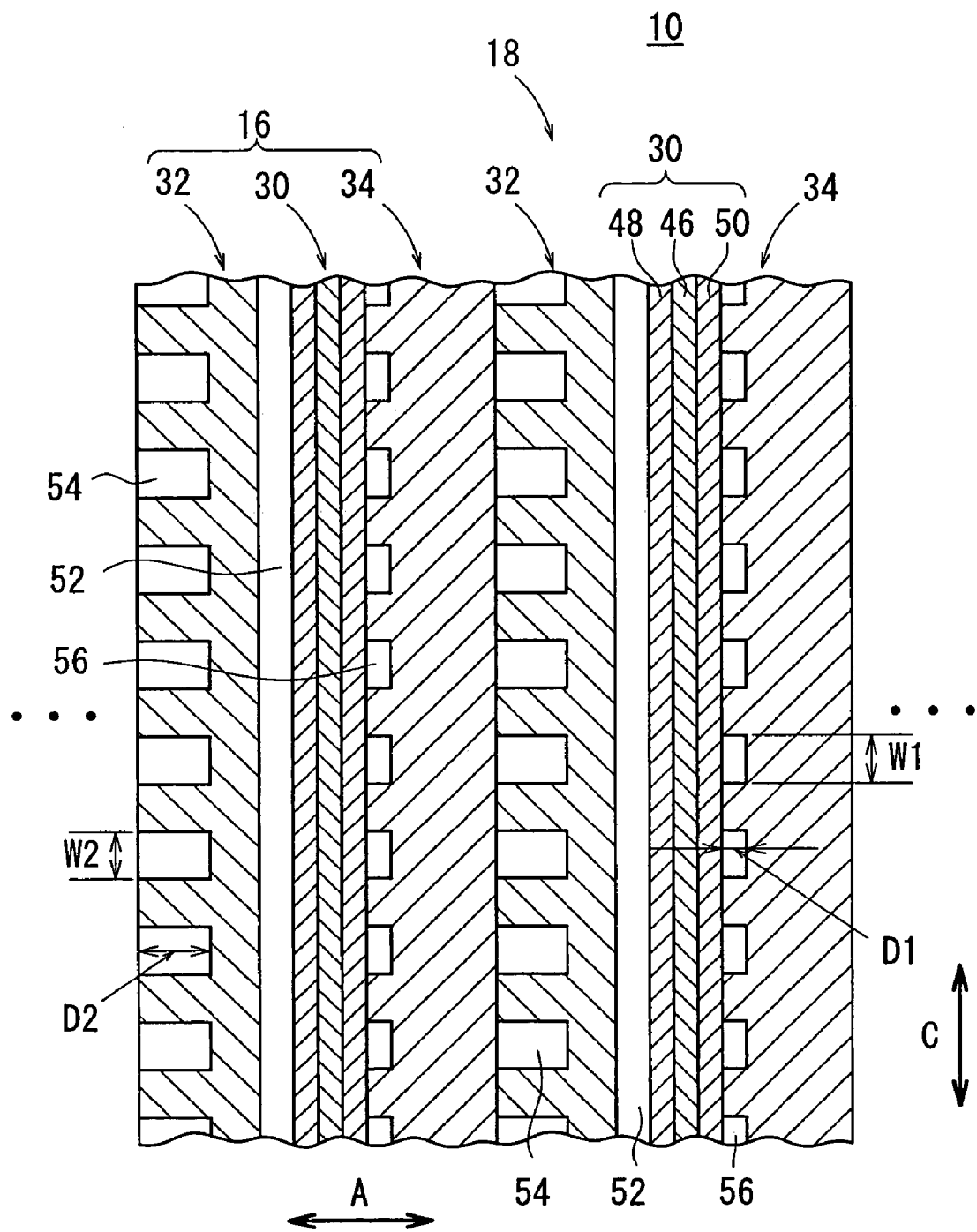
FIG. 3 is a cross sectional view showing a part of the fuel cell stack.

FIG. 1 is a perspective view schematically showing a fuel cell system 12 including a fuel cell stack 10 according to a first embodiment of the present invention. FIG. 2 is an exploded perspective view schematically showing a casing 14 for covering the fuel cell stack 10. FIG. 3 is a cross sectional view showing a part of the fuel cell stack 10.

The fuel cell stack 10 includes a stack body 18 formed by stacking a plurality of power generation cells 16 in a direction indicated by an arrow A. At an end of the stack body 18 in the stacking direction indicated by the arrow A, a terminal plate 20a is provided. Further, an insulating plate 22a is provided outside the terminal plate 20a, and an end plate 24a is provided outside the insulating plate 22a. At the other end of the stack body 18 in the stacking direction indicated by the arrow A, a terminal plate 20b is provided. Further, an insulating plate 22b is provided outside the terminal plate 20b, and an end plate 24b is provided outside the insulating plate 22b.

Figure 4:
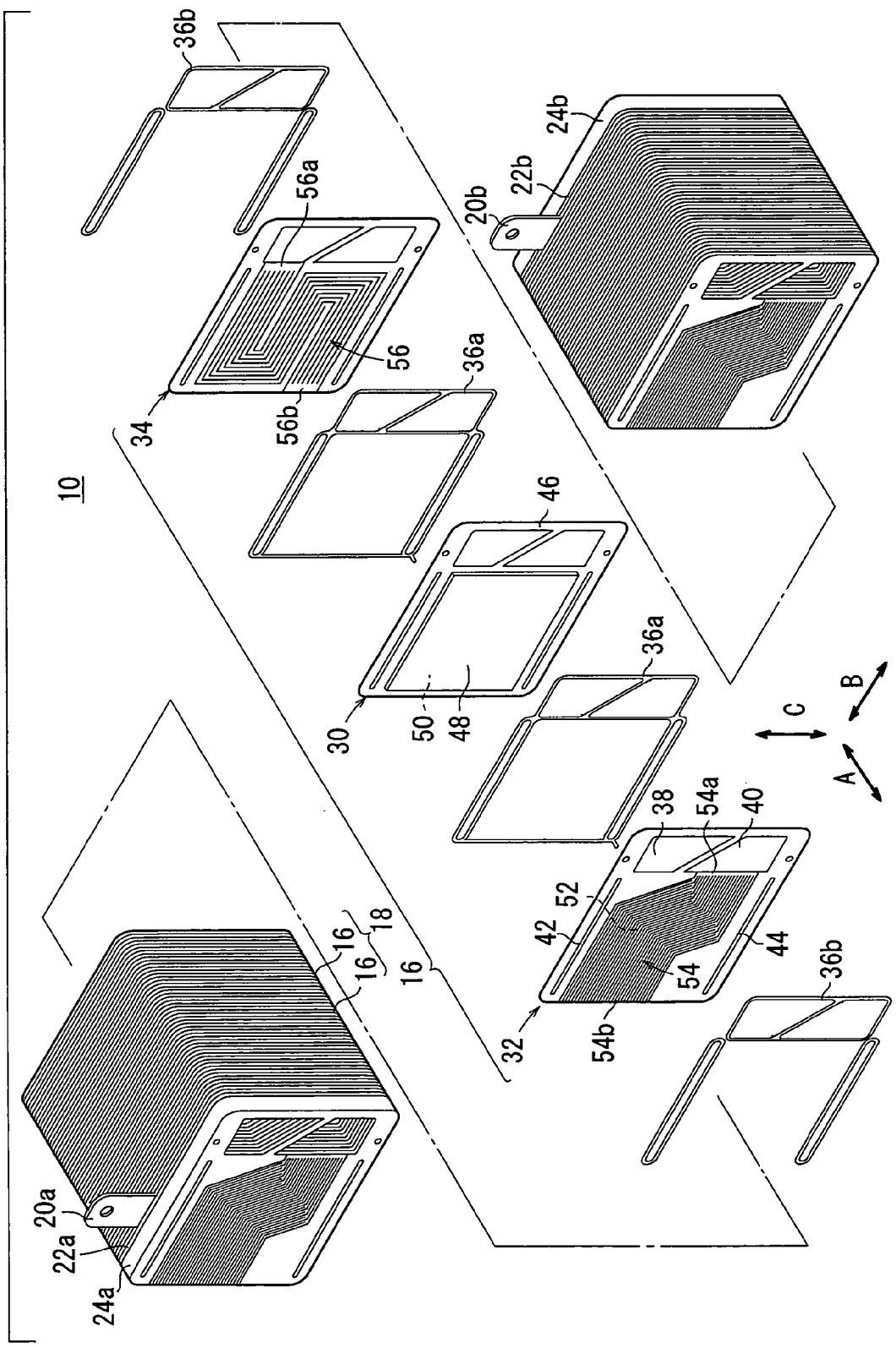
FIG. 4 is an exploded perspective view schematically showing a part of the fuel cell stack.

As shown in FIG. 4, each of the power generation cells 16 includes a membrane electrode assembly 30 and first and second separators 32, 34 sandwiching the membrane electrode assembly 30. Seal members 36a are provided between the membrane electrode assembly 30 and the first separator 32, and between the membrane electrode assembly 30 and the second separator 34. The seal members 36a are provided around the fluid passages and the electrode surfaces as described later. Seal members 36b are provided between the adjacent power generation cells 16.

At one end of the power generation cell 16 in a horizontal direction indicated by an arrow B, a reactant air supply passage 38 and a coolant air supply passage 40 are provided. The reactant air supply passage 38 and the coolant air supply passage 40 extend through the power generation cells 16 in the stacking direction indicated by the arrow A. The reactant air supply passage 38 is used for supplying the air as an oxygen-containing gas used in the reaction of the fuel cell stack 10. The coolant air supply passage 40 is used for supplying the air as a coolant used for cooling the fuel cell stack 10. The area of opening (cross sectional area of the flow path) of the reactant air supply passage 38 and the area of opening (cross sectional area of the flow path) of the coolant air supply passage 40 are substantially the same.

At one upper end of the power generation cell 16 in a vertical direction indicated by an arrow C, a fuel gas supply passage 42 is provided for supplying a fuel gas (e.g., hydrogen gas) to the fuel cell stack 10. Further, at the other lower end of the power generation cell 16 in a vertical direction indicated by the arrow C, a fuel gas discharge passage 44 is provided for discharging the fuel gas from the fuel cell stack 10. The fuel gas supply passage 42 and the fuel gas discharge passage 44 extend through the fuel cell stack 10 in the direction indicated by the arrow A. The openings of the fuel gas supply passage 42 and the fuel gas discharge passage 44 are elongated in the direction indicated by the arrow B.

The membrane electrode assembly 30 includes an anode 48, and a cathode 50, and a solid polymer electrolyte membrane 46 interposed between the anode 48 and the cathode 50 (see FIGS. 3 and 4). The solid polymer electrolyte membrane 46 is formed by impregnating a thin membrane of perfluorosulfonic acid with water, for example.

Each of the anode 48 and the cathode 50 includes a gas diffusion layer such as a porous carbon paper, carbon cloth, or nonwoven carbon fabric, and an electrode catalyst layer of noble metal supported on a carbon base material. The electrode catalyst layer of the anode 48 and the electrode catalyst layer of the cathode 50 are provided on both surfaces of the solid polymer electrolyte membrane 46. The first and second separators 32, 34 are made of electrically conductive material such as dense carbon material or metal.

Figure 5:
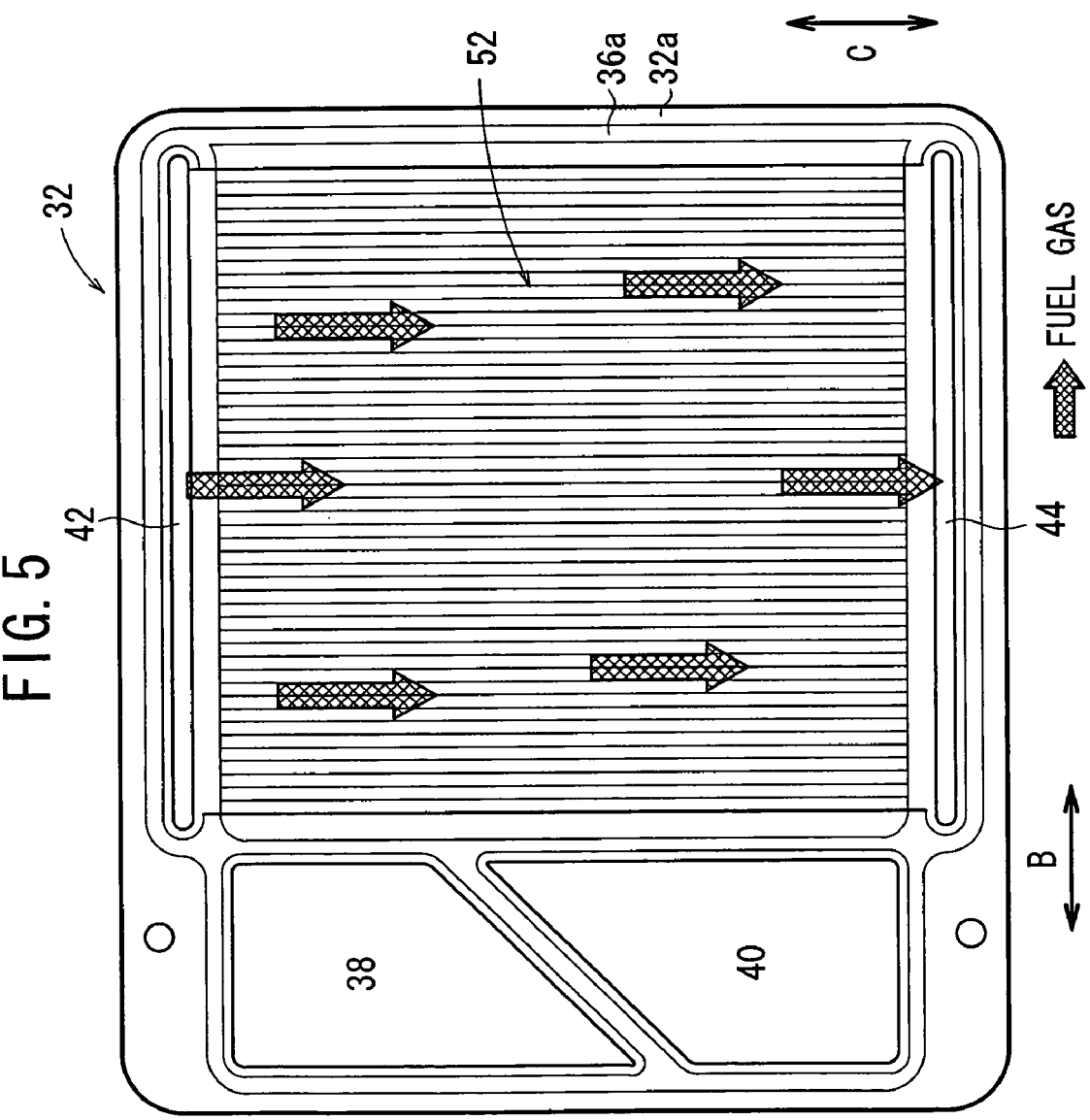
FIG. 5 is a front view showing one surface of a first separator of the fuel cell stack.

As shown in FIG. 5, the first separator 32 has a fuel gas flow channel 52 on its surface 32a facing the anode 48. The fuel gas flow channel 52 is connected between the fuel gas supply passage 42 and the fuel gas discharge passage 44. For example, the fuel gas flow channel 52 includes a plurality of grooves extending in a direction indicated by an arrow C.

Figure 6:
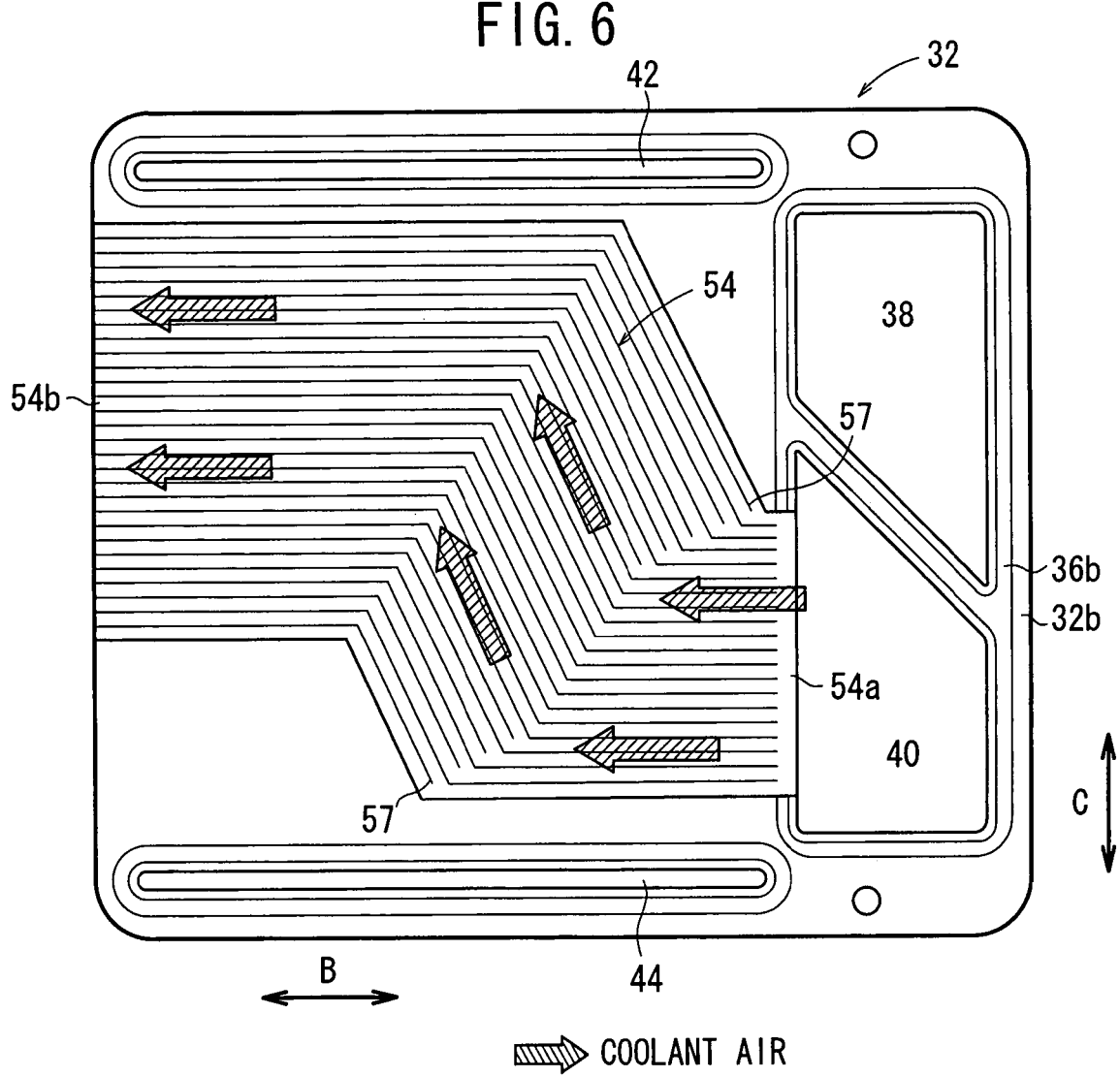
FIG. 6 is a front view showing the other surface of the first separator shown in FIG. 5.

As shown in FIG. 6, the first separator 32 has a coolant air flow channel 54 on its surface 32b opposite to the surface 32a. The coolant air flow channel 54 includes a plurality of grooves (coolant air grooves) having angled central portion, and extending horizontally. The coolant air flow channel 54 includes a coolant air inlet 54a, and a coolant air outlet 54b. The coolant air outlet 54b is positioned at side portion of the first separator 32, and exposed directly to the outside. Partition walls 57 are provided in the coolant air flow channel 54. Each of the partition walls 57 divides the coolant air to flow separately into two grooves.

Figure 7:
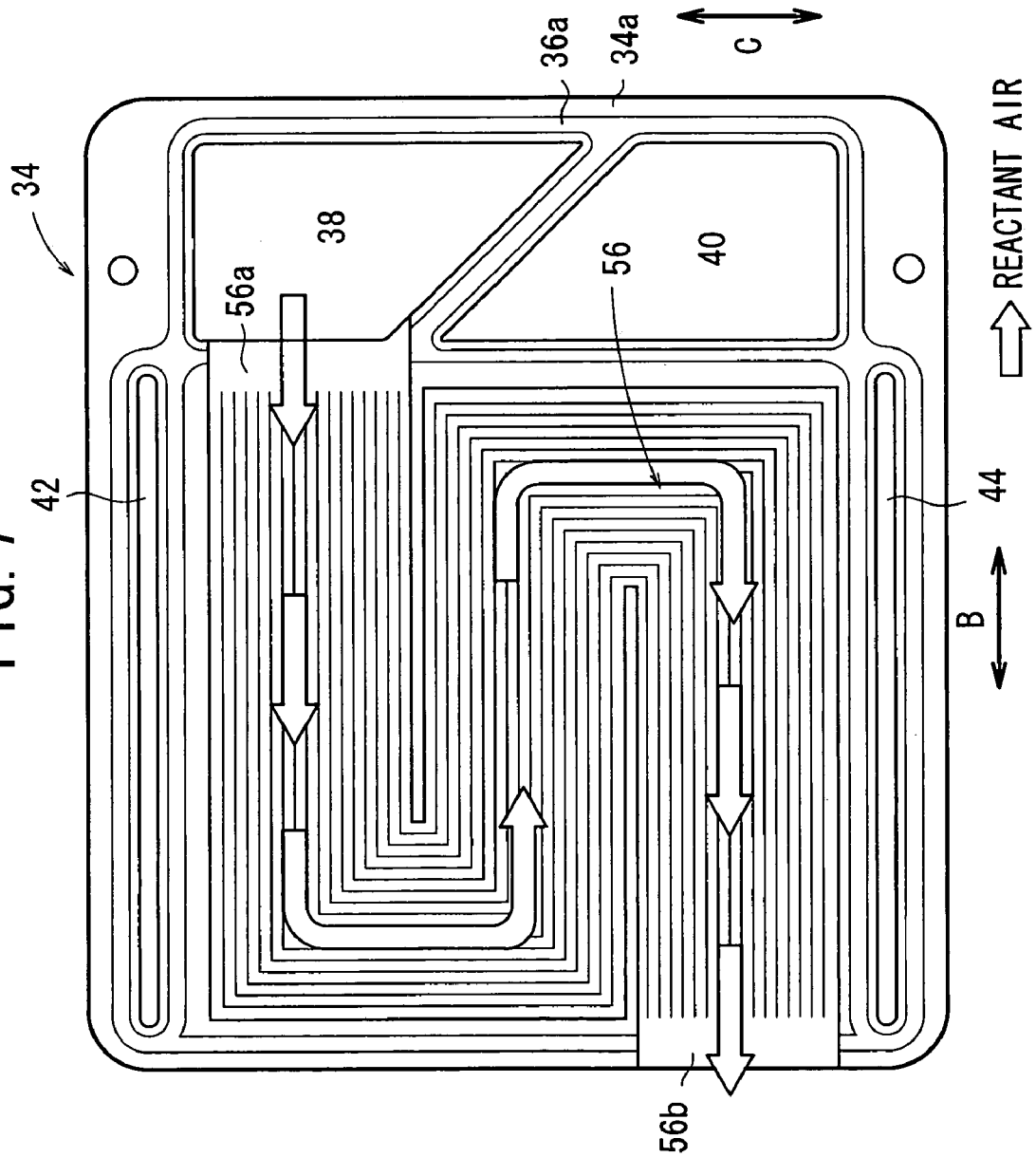
FIG. 7 is a front view showing one surface of a second separator of the fuel cell stack.

As shown in FIG. 7, the second separator 34 has a reactant air flow channel 56 on its surface 34a facing the cathode 50 of the second separator 34. The reactant air flow channel 56 includes a plurality of grooves (reactant air grooves) having two turn regions so that the reactant air flow through the reactant air flow channel 56 in a serpentine pattern. The reactant air flow channel 56 is connected between a reactant air inlet 56a connected to the reactant air supply passage 38, and a reactant air outlet 56b connected to the outside through a duct 78 as described later. The reactant air inlet 56a is provided at an upper position of the second separator 34, and the reactant air outlet 56b is provided at a lower position of the second separator 34.

As shown in FIGS. 1 and 2, backup plates 58a, 58b are provided at opposite ends of the fuel cell stack 10 in the stacking direction. The backup plate 58a has a reactant air supply port 60 connected to the reactant air supply passage 38, a coolant air supply port 62 connected to the coolant air supply passage 40, a fuel gas supply port 64 connected to the fuel gas supply passage 42, and a fuel gas discharge port 66 connected to the fuel gas discharge passage 44.

A casing 14 is used for covering the fuel cell stack 10 between the backup plates 58a, 58b. Tightening members 68a, 68b, 68c, and 68d are provided at corners of the fuel cell stack 10, and tighten the fuel cell stack 10 from the outside. The tightening members 68a through 68d are fixed to the backup plates 58a, 58b using screws 70 which is inserted into the fuel cell stack 10 at the opposite ends in stacking direction. The tightening members 68a through 68d are chiefly made of lightweight alloy. Insulating layers are used as surfaces of the tightening members 68a through 68d.

Lower plates 72a, 72b, and side plates 72c, 72d are fixed to the tightening members 68a through 68d by screws. The lower plates 72a, 72b, and the side plates 72c, 72d are made of galvanized steel, or resin.

A coolant air discharge port 74 having a large dimension in the direction indicated by the arrow A is formed on an upper part of the side plate 72c, at a position corresponding to the coolant air outlets 54b of the coolant air flow channels 54 in the respective power generation cells 16. Further, a reactant air discharge port 76 having a large dimension in the direction indicated by the arrow A is formed on a lower part of the side plate 72c, at a position corresponding to the reactant air outlets 56b of the reactant air channels 56 in the respective power generation cells 16. The duct 78 is formed around the reactant air discharge port 76.

As shown in FIG. 2, a water drainage 80 is provided below the reactant air outlets 56b for discharging water from the fuel cell stack 10 (see FIGS. 4 and 7). The water drainage 80 includes a liquid water tray 82 and a liquid water channel 84 extending in the direction indicated by the arrow A. The liquid water channel 84 is formed in the tightening member 68a.

The water tray 82 is provided below the duct 78 for guiding the liquid water which has been splashed laterally. The liquid water received by the water tray 82 flows toward the liquid water channel 84 extending in the direction indicated by the arrow A along the tightening member 68a. A drain hole 88 is provided at a substantially central position of the liquid water channel 84.

As shown in FIG. 1, a blower (air supply source) 90 is connected to the reactant air supply port 60 and the coolant air supply port 62 on the backup plate 58a. The blower 90 is an auxiliary device for supplying the reactant air to the reactant air supply port 60 and the coolant air to the coolant air supply port 62. Further, a hydrogen tank 94 is connected to the fuel gas supply port 64 on the backup plate 58a through a pressure reducing valve 96. The hydrogen tank 94 supplies the fuel gas to the fuel gas supply port 64.

Operation of the fuel cell stack 10 will be described below. The fuel cell stack 10 is operated at a relatively low temperature. For example, the fuel cell stack 10 is operated at a temperature of 60° C. or less, preferably in the range of 30° C. to 50° C. The reactant gases (hydrogen gas and air) are supplied to the fuel cell stack 10 for power generation. The hydrogen gas is supplied to the fuel cell stack 10 at a pressure in the range of 0.1 kPa to 50 kPa, and the air is supplied to the fuel cell stack 10 at a pressure in the range of 0.1 kPa to 50 kPa.

As shown in FIG. 1, in the fuel cell system 12, the pressure of the fuel gas supplied from the hydrogen tank 94 is reduced to the pressure in the range of 0.1 kPa to 50 kPa by the pressure reducing valve 96. Then, the fuel gas is supplied to the fuel gas supply port 64 of the fuel cell stack 10. In the fuel cell stack 10, the fuel gas flow through the fuel gas supply passage 42, and flows into the fuel gas flow channel 52 of the first separator 32 (see FIGS. 3 and 5). Thus, the fuel gas flows downwardly along the anode 48 of the membrane electrode assembly 30 for inducing an electrochemical reaction at the anode 48.

Further, as shown in FIG. 1, the reactant air at the pressure of about 0.1 kPa to 50 kPa is supplied by the blower 90 to the reactant air supply port 60 of the fuel cell stack 10. In the fuel cell stack 10, the reactant air flows through the reactant air supply passage 38, and flows into the reactant air flow channel 56 of the second separator 34 (see FIGS. 3 and 7). Thus, the reactant air flows along the cathode 50 of the membrane electrode assembly 30 in a serpentine pattern downwardly (in the direction of gravity) for inducing an electrochemical reaction at the cathode 50.

The fuel gas and the reactant air are consumed in the electrochemical reactions at the electrode catalyst layers of the anode 48 and the cathode 50 of the membrane electrode assembly 30 for generating electricity (see FIG. 3).

Further, as shown in FIG. 1, the blower 90 is used to supply the coolant air to the coolant airport 62 of the fuel cell stack 10 at the pressure of about 0.1kPa to 50kPa, i.e., substantially at the same pressure of the reactant air supplied to the reactant air supply port 60. In the fuel cell stack 10, the coolant air flows through the coolant air supply passage 40, end flows into the coolant air flow channel 54 of the first separator 32 (see FIGS. 3 and 6). In this manner, the operating temperature in each of the power generation cells 16 is regulated at 60° C. or less, preferably in the range of 30° C. to 50° C.

Each of the power generation cells 16 is operated at a relatively low temperature. Therefore, even if the reactant air and the fuel gas are not humidified, and supplied to the fuel cell stack 10 at a low humidity, the solid polymer electrolyte membrane 46 is not dried easily. Thus, the auxiliary devices such as the humidifier are not required.

After the hydrogen in the fuel gas is partially consumed at the anode 48, the fuel gas is discharged into the fuel gas discharge passage 44, and flows in the direction indicated by the arrow A. Then, the fuel gas is discharged to the outside from the fuel gas discharge port 66 of the backup plate 58a. After the oxygen in the reactant air is partially consumed at the cathode 50, the reactant air is discharged from the reactant gas outlet 56b to the outside trough the duct 78. After the coolant air flows along the coolant air flow channel 54 to cool the membrane electrode assembly 30, the coolant air is discharged directly to the outside from the coolant air outlet 54b of the coolant air flow channel 54.

The fuel cell stack 10 is operated at the low temperature of 60° C. or less, preferably in the range of 30° C. to 50° C. Therefore, most of the water produced in the power generation is in liquid phase. The liquid water can be discharged from the reactant air outlet 56b of the reactant air flow channel

56 together with the remaining reactant air after the electrochemical reaction at the cathode 50.

At the reactant air outlet 56b, the reactant air and the liquid water are separated from each other. Specifically, the reactant air is directly discharged to the outside through the duct 78 of the side plate 72c together with the water vapor. The liquid water moves downwardly by its own weight from the reactant air outlet 56b, and drops onto the water drainage 80. Even if the liquid water is partially splashed toward the duct 78, the liquid water tray 82 positioned below the duct 78 effectively collects the splashed liquid water. Therefore, the liquid water smoothly moves down into the water drainage 80 (see FIG. 2).

As described above, the liquid water drops onto the water drainage 80, and moves downwardly toward the liquid water channel 84, and is discharged reliably to the outside of the fuel cell stack 10 through the drain hole 88 provided at the substantially central position of the liquid water channel 84.

In the first embodiment, the blower 90 is used to supply both of the reactant air and the coolant air to the reactant air inlet 56a and the coolant air inlet 54a, respectively. The reactant air and the coolant air are directly discharged from the fuel cell stack 10 through the reactant air outlet 56b of the reactant air flow channel 56 and the coolant air outlet 54a of the coolant air flow channel 54, respectively. The pressure loss ΔPre of the reactant air between the reactant air inlet 56a and the reactant air outlet 56b and the pressure loss ΔPco of the coolant air between the coolant air inlet 54a and the coolant air outlet 54b are substantially the same.

With the structure, it is possible to supply the reactant air and the coolant air to the reactant air inlet 56a, and the coolant air inlet 54a, respectively at low pressure. Since the blower 90 is not required to supply the air at high pressure, the power consumption of the blower 90 is small. The overall power generation efficiency of the fuel cell stack 10 can be improved significantly.

When the pressure loss ΔPre of the reactant air and the pressure loss ΔPco of the coolant air are substantially the same, the flow rate of the reactant air Vre needed to carry out the rated power generation in the fuel cell stack 10 and the flow rate of the coolant air Vco needed to maintain the operation temperature of the fuel cell stack 10 at the low temperature of 60° C. or less, preferably in the range of 30° C. to 50° C. can be ensured by providing the grooves of the reactant air flow channel 56 and the coolant air flow channel 54 in the following manner.

Firstly, the required flow rate Vre of the reactant air is calculated by the following equation (1).

$$Vre[\text{normal l/min.}] = \{I \times S/(2 \times 96485 \times 2)\} \times 22.4 \times (1/0.2095) \times 60 \quad (1)$$

I: rated current density in the power generation cell 16 [A/cm$^2$]

S: surface area of the electrode [cm$^2$]

It is assumed that the utilization ratio of the reactant air in the fuel cell stack 10 is 100%.

The required flow rate Vco of the coolant air is calculated by the following equation (2).

$$Vco[\text{normal l/min.}] = \{Q/Cp \times (Tout - Tin) \times 0.6)\} \times (22.4/28.8) \times 1000 \quad (2)$$

$$Q = (V0 - V) \times I \times S \times 60 \quad (3)$$

Q: amount of heat energy generated by the power generation cell 16 in one minute [J/min.]

I: rated current density in the power generation cell 16 [A/cm$^2$]

S: surface area of the electrode [cm$^2$]

V0: theoretical electromotive force by the reactions of the fuel gas and the oxygen-containing gas [v]

V: cell voltage when the electrode surface area is S cm$^2$ [V]

Cp: specific heat of the coolant air [J/kg×K]

Tout: temperature of the coolant air at the coolant air outlet 54b [K]

Tin: temperature of the coolant air at the coolant air inlet 54a [K]

It is assumed that the coolant air removes 60% of the heat energy Q generated in the fuel cell stack 10.

The pressure loss ΔPre of the reactant air between the reactant air inlet 56a and the reactant air outlet 56b is calculated generally by the following functional equation (4):

$$\Delta Pre = fx(Vre, Sre, Lre, Nre) \quad (4)$$

where Vre is the flow rate of the reactant air, Sre is the area of opening (cross sectional area of the flow path) of the reactant air flow channel 56, Lre is the length of the grooves of the reactant air flow channel 56, Nre is the number of the grooves of the reactant air flow channel 56, and fx is a sign indicating a mathematical function. Vre, Sre, Lre, and Nre are variables.

Figure 8:
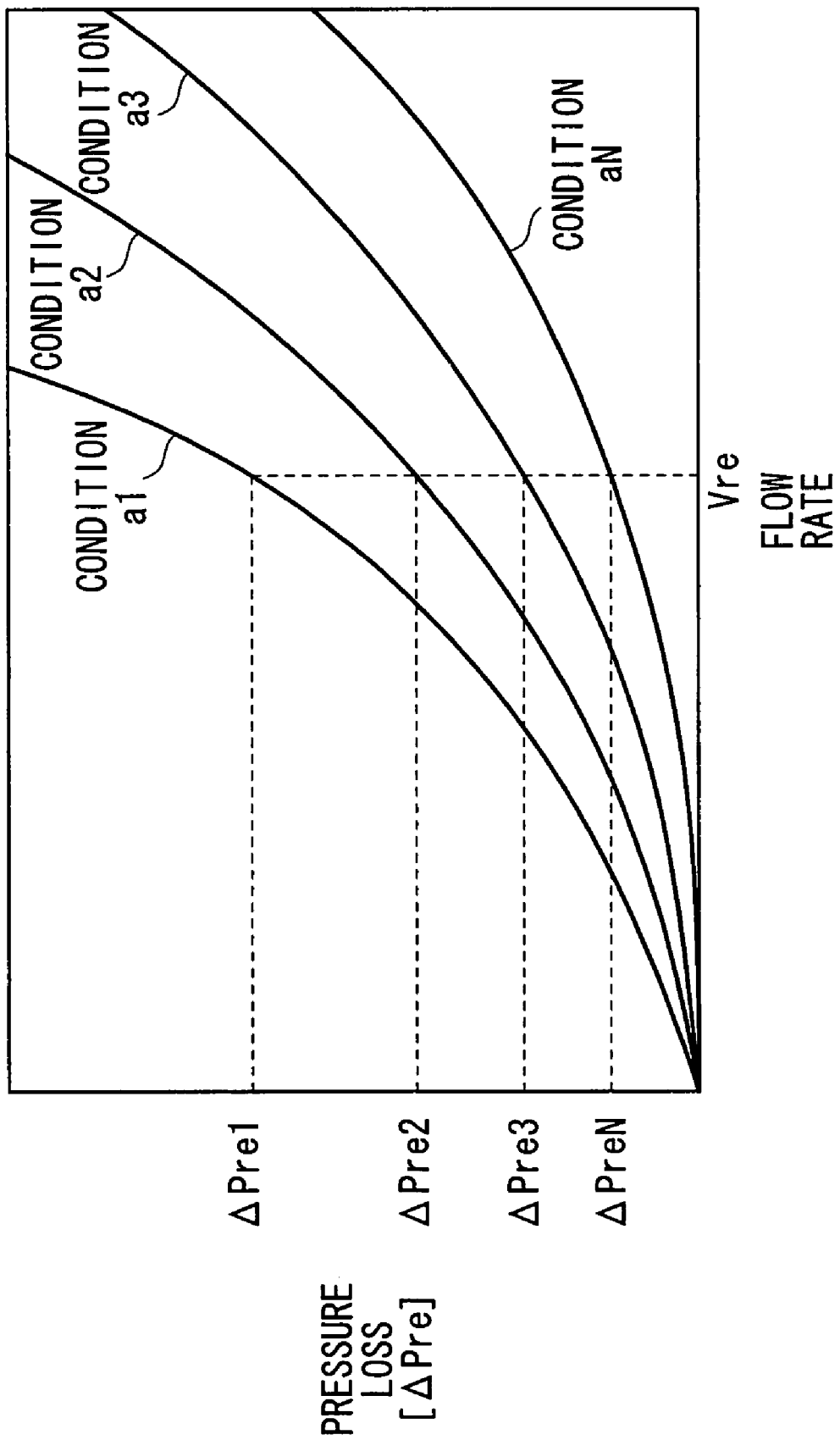
FIG. 8 is a graph showing relationship between the pressure loss and the flow rate of a reactant air.

FIG. 8 is a graph schematically showing relationship between the flow rate Vre of the reactant air and the pressure loss ΔPre of the reactant air under different conditions a1 through aN. These conditions a1 through aN change depending on the variables of Sre, Lre, Nre. The pressure loss ΔPre of the reactant air is determined depending on the flow rate Vre of the reactant air determined by the equation (1), for example, and selected from the pressure loss ΔPre1, ΔPre2, ΔPre3, ΔPreN, depending on the conditions a1 to aN.

The pressure loss ΔPco of the coolant air between the coolant air inlet 54a and the coolant air outlet 54b is calculated in the same manner as the pressure loss ΔPre of the reactant air, generally by the following functional equation (5):

$$\Delta Pco = fx(Vco, Sco, Lco, Nco) \quad (5)$$

where Vco is the flow rate of the coolant air, Sco is the area of opening (cross sectional area of the flow path) of the coolant air flow channel 54, Lco is the length of the grooves of the coolant air flow channel 54, Nco is the number of grooves in the coolant air flow channel 54, and fx is a sign indicating a mathematical function. Vco, Sco, Lco, and Nco are variables.

Figure 9:
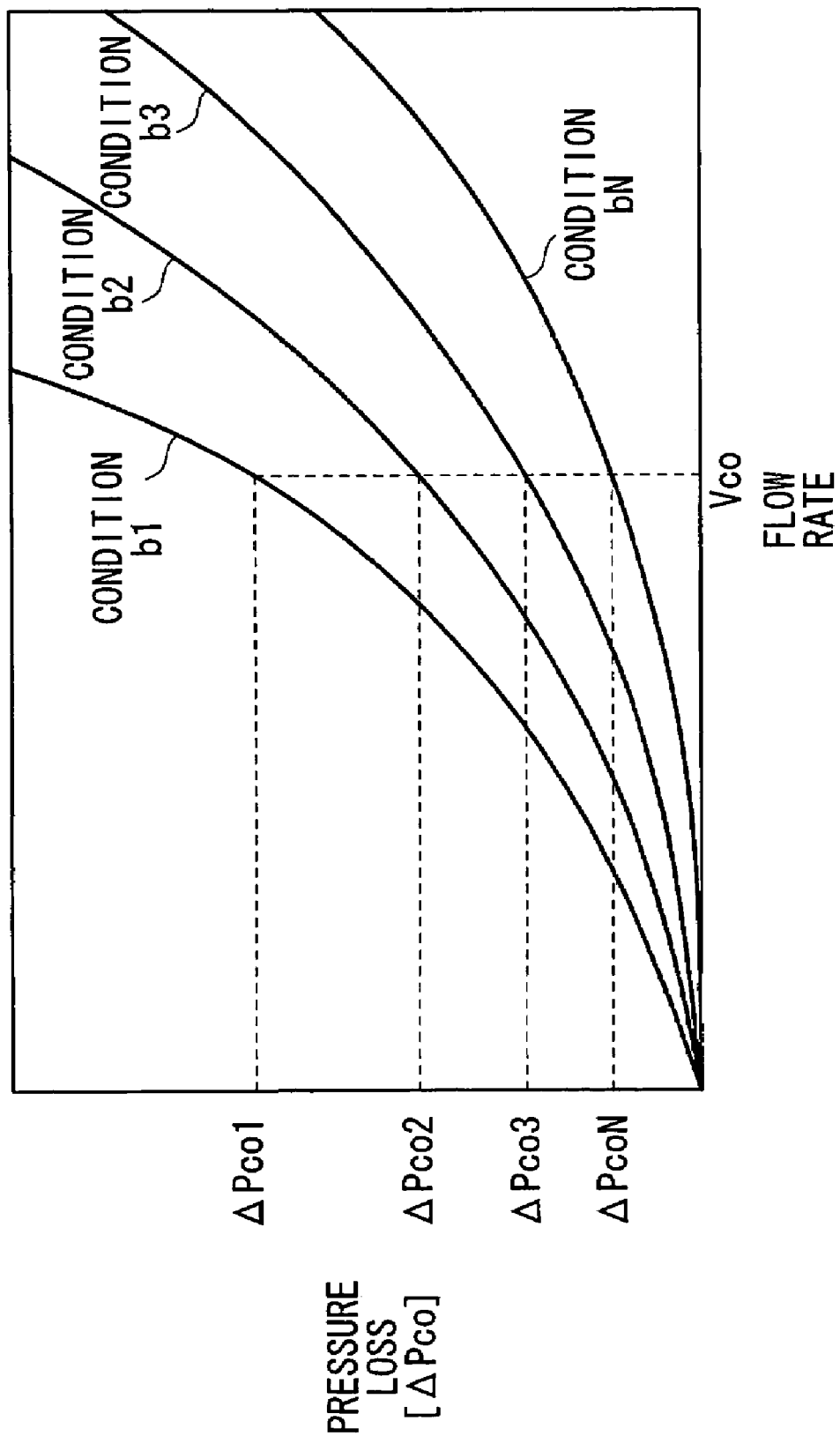
FIG. 9 is a graph showing relationship between the pressure loss and the flow rate of a coolant air.

FIG. 9 is a graph schematically showing relationship between the flow rate Vco of the coolant air and the pressure loss ΔPco of the coolant air under different conditions b1 through bN. These conditions b1 through bN change depending on the variables of Sco, Lco, Nco. The pressure loss ΔPco of the coolant air is determined depending on the flow rate Vco of the coolant air determined by the equation (2), for example, and selected from the pressure loss ΔPco1, ΔPco2, ΔPco3, ΔPcoN, depending on the conditions b1 to bN.

In this manner, the reactant air flow channel 56 and the coolant air flow channel 54 are formed such that the pressure loss ΔPre of the reactant air and the pressure loss ΔPco of the coolant air are substantially the same, taking the flow rate Vre of the reactant air and the flow rate Vco of the coolant air into account. Assuming that the pressure loss ΔPre of the reactant air is ΔPreN and the pressure loss ΔPcon of the coolant air is ΔPcoN, and the values of ΔPreN and ΔPcoN are the same, the cross sectional area Sre of the grooves of the reactant air flow channel 56, the length Lre of the grooves of the reactant air flow channel 56, the number Nre of the grooves of the reactant air flow channel 56, the cross sectional area Sco of the grooves of the coolant air flow channel 54, the length Lco of the grooves of the coolant air flow channel 54, the number Nco of the grooves of the coolant air flow channel 54, are calculated based on the above conditions aN and bN (see FIGS. 8 and 9).

The electrical energy consumed for operating the blower 90 can be reduced by suppressing the pressure of air supplied from the blower 90. Under the condition, the reactant air flow channel 56 and the coolant air flow channel 54 are configured such that the pressure loss ΔPre and the pressure loss ΔPco are substantially the same.

The total flow rate Vtotal of the air supplied from the blower 90, i.e., the sum of the flow rate Vre of the reactant air and the flow rate Vco of the coolant air is calculated by the following equation (6).

$$V\text{total [normal l/min.]}=(Vre+Vco)\times N \quad (6)$$

N: number of power generation cells 16

For example, assuming that the pressure loss ΔPre of the reactant air is ΔPreN and the pressure loss ΔPco of the coolant air is ΔPcoN, and the values of ΔPreN and ΔPcoN are substantially the same, the blower 90 used in the fuel cell system 12 is selected such that the blower 90 can supply the air at the pressure of ΔPreN (ΔPcoN) or more, at the total flow rate of Vtotal or more.

Figure 10:
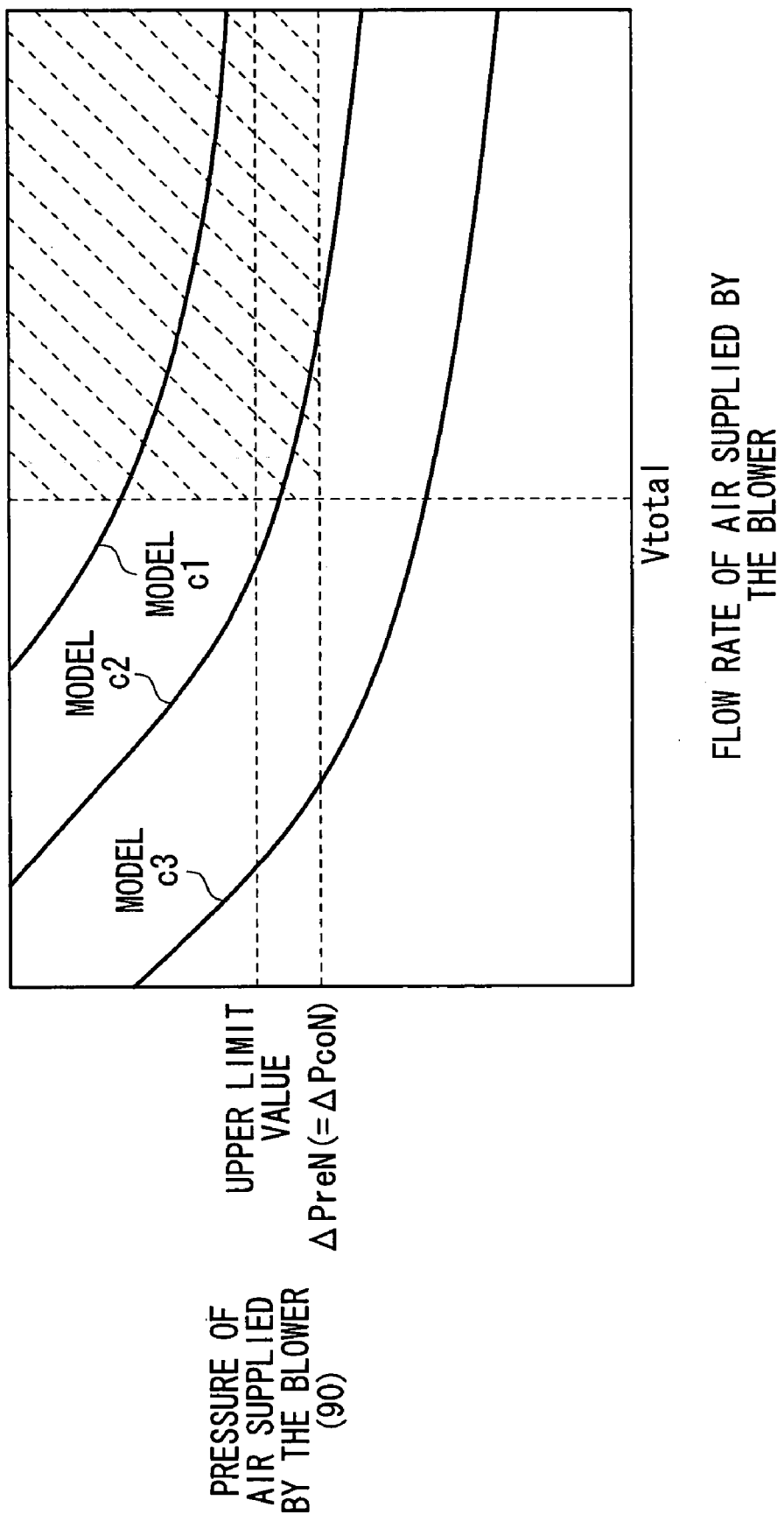
FIG. 10 is a graph showing relationship between the flow rate of the air supplied by a blower and the pressure of the air supplied by the blower.

Specifically, FIG. 10 shows three models c1 to c3 of the blower 90. The models c1 and c2 are capable of supplying the air at the pressure larger than the pressure loss ΔPreN (ΔPcoN) or more, and at the total flow rate of Vtotal or more (see the hatched area in FIG. 10). When there are some constraints with the electrical energy for operating the blower 90, and the blower 90 can not supply the air at the pressure above the upper limit value shown in FIG. 10, the model c2 which satisfies the upper limit requirement is selected.

As described above, the cross sectional area Sre of the grooves of the reactant air flow channel 56, the length Lre of the grooves of the reactant air flow channel 56, the number Nre of the grooves of the reactant air flow channel 56, the cross sectional area Sco of the grooves of the coolant air flow channel 54, the length Lco of the grooves of the coolant air flow channel 54, the number Nco of the grooves of the coolant air flow channel 54, are determined such that the sufficient flow rate Vre of the reactant air, the sufficient flow rate Vco of the coolant air are maintained, and the pressure loss ΔPre of the reactant air and the pressure loss ΔPco of the coolant air are substantially the same. Thus, the blower 90 can be used commonly for supplying both of the reactant air and the coolant air to the fuel cell stack 10.

Consequently, conventional dedicated blowers, pipes, valves for supplying the reactant air and the coolant air to the fuel cell stack 10 from the outside are not required. Thus, the fuel cell system 12 is small, and produced or operated at low cost. Further, the use of the common blower 90 is effective for reducing power consumption, and the power generation efficiency of the fuel cell stack 10 can be improved.

Next, a fuel cell system 102 including a fuel cell stack 100 according to a second embodiment will be described with reference to FIGS. 11 through 15. The constituent elements that are identical to those of the fuel cell stack 10 and the fuel cell system 12 are labeled with the same reference numeral, and description thereof will be omitted.

Figure 11:
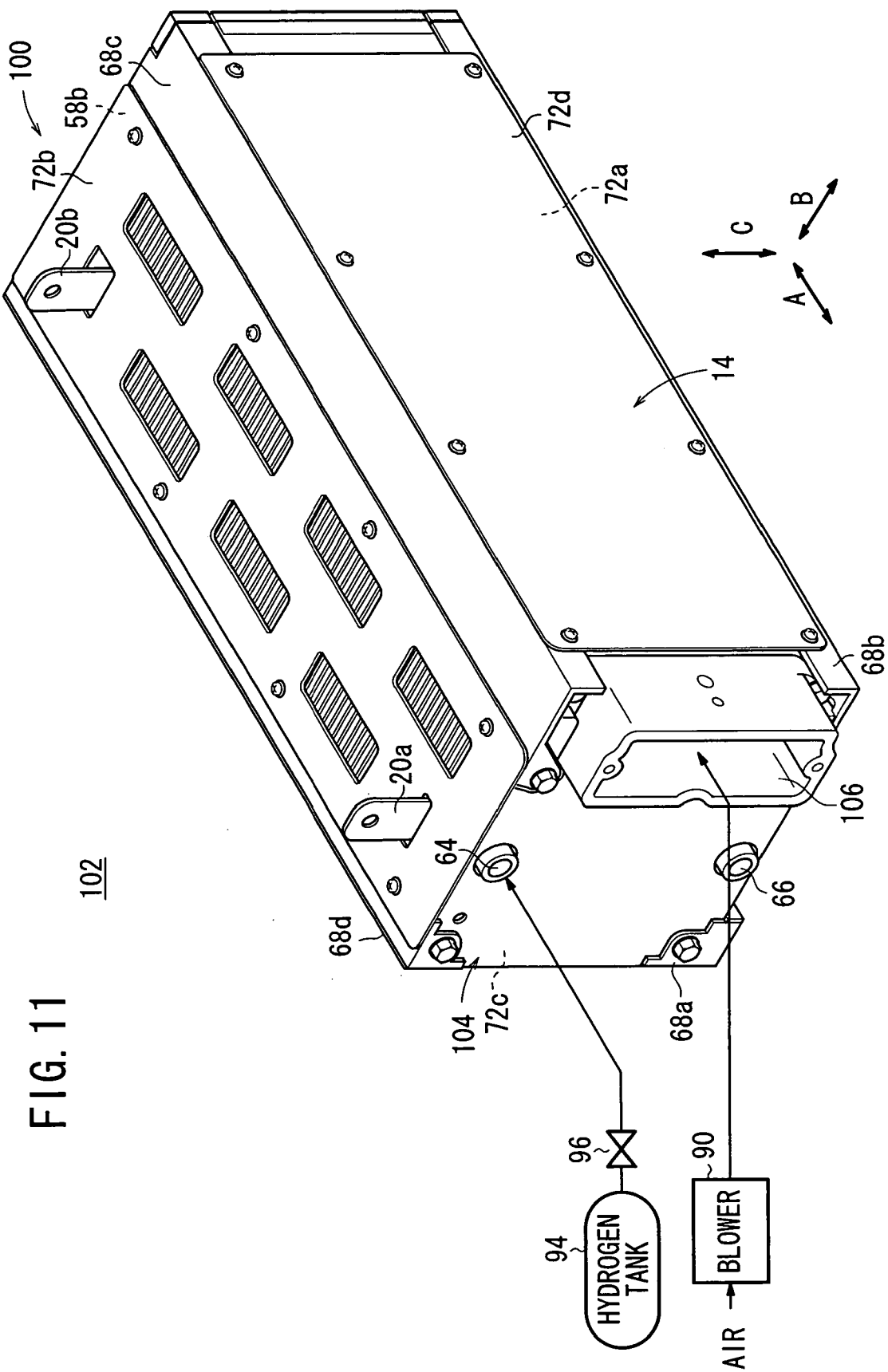
FIG. 11 is a perspective view schematically showing a fuel cell system including a fuel cell stack according to a second embodiment of the present invention.

As shown in FIG. 11, at one end of the backup plate 104 in the stacking direction of the fuel cell stack 100, an air supply port 106 is formed. The air supply port 106 has functions of the reactant air supply port 60 and the coolant air supply port 62 according to the first embodiment (see FIG. 1). The air is supplied into the fuel cell stack 100 through the air supply port 106.

Figure 12:
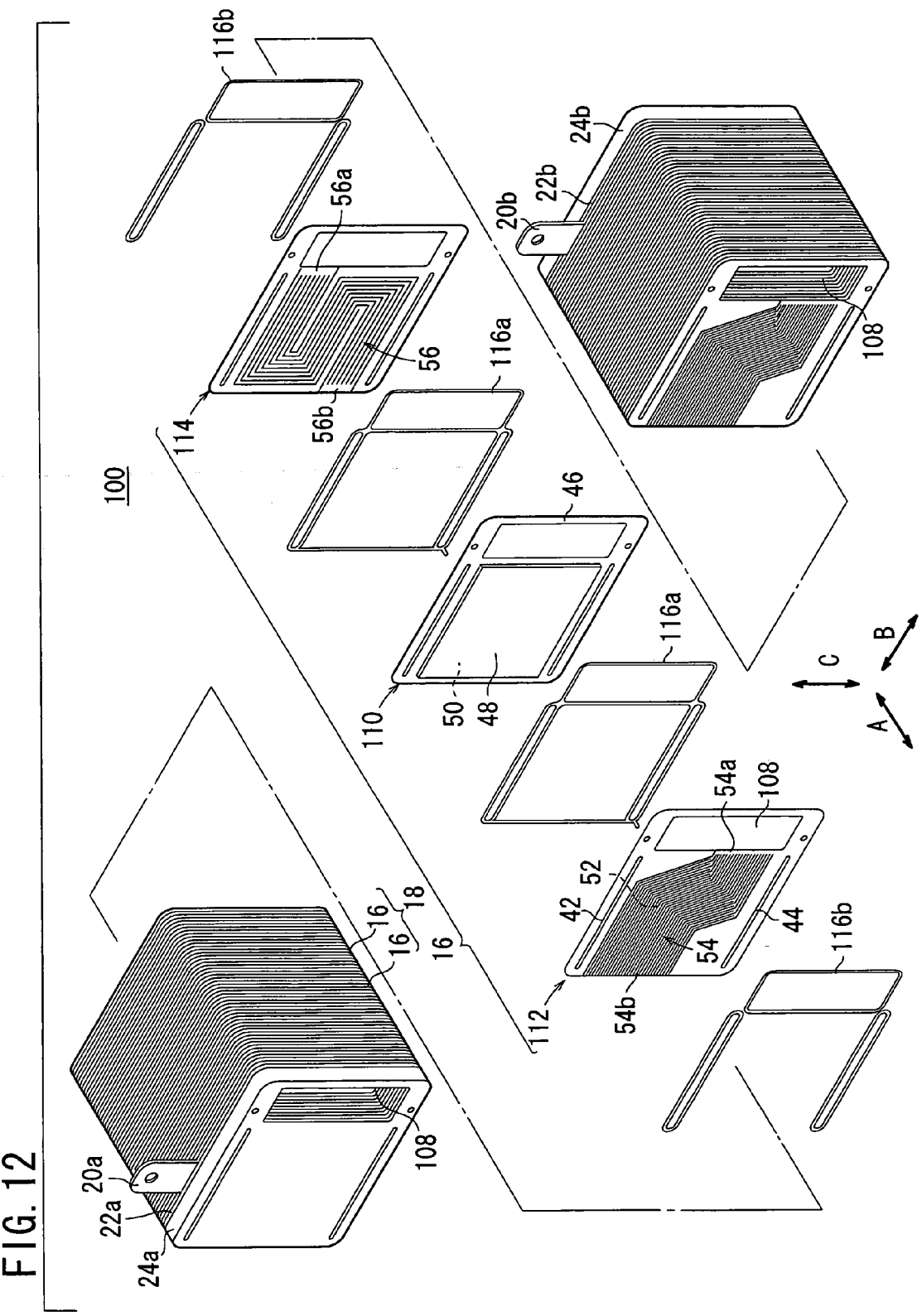
FIG. 12 is an exploded perspective view showing a part of the fuel cell stack according to the second embodiment.
Figure 13:
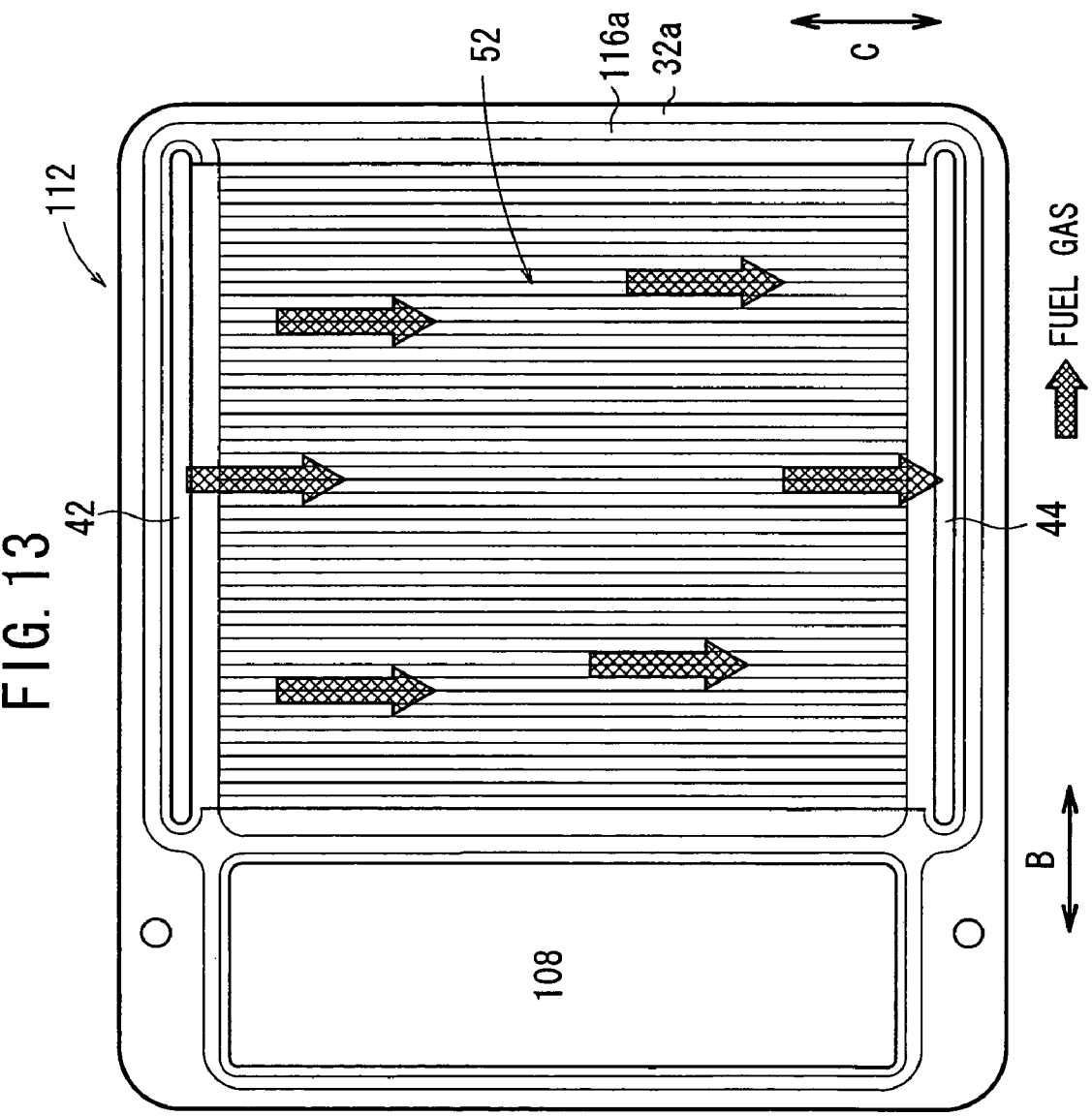
FIG. 13 is a front view showing a first separator of the fuel cell stack according to the second embodiment.
Figure 14:
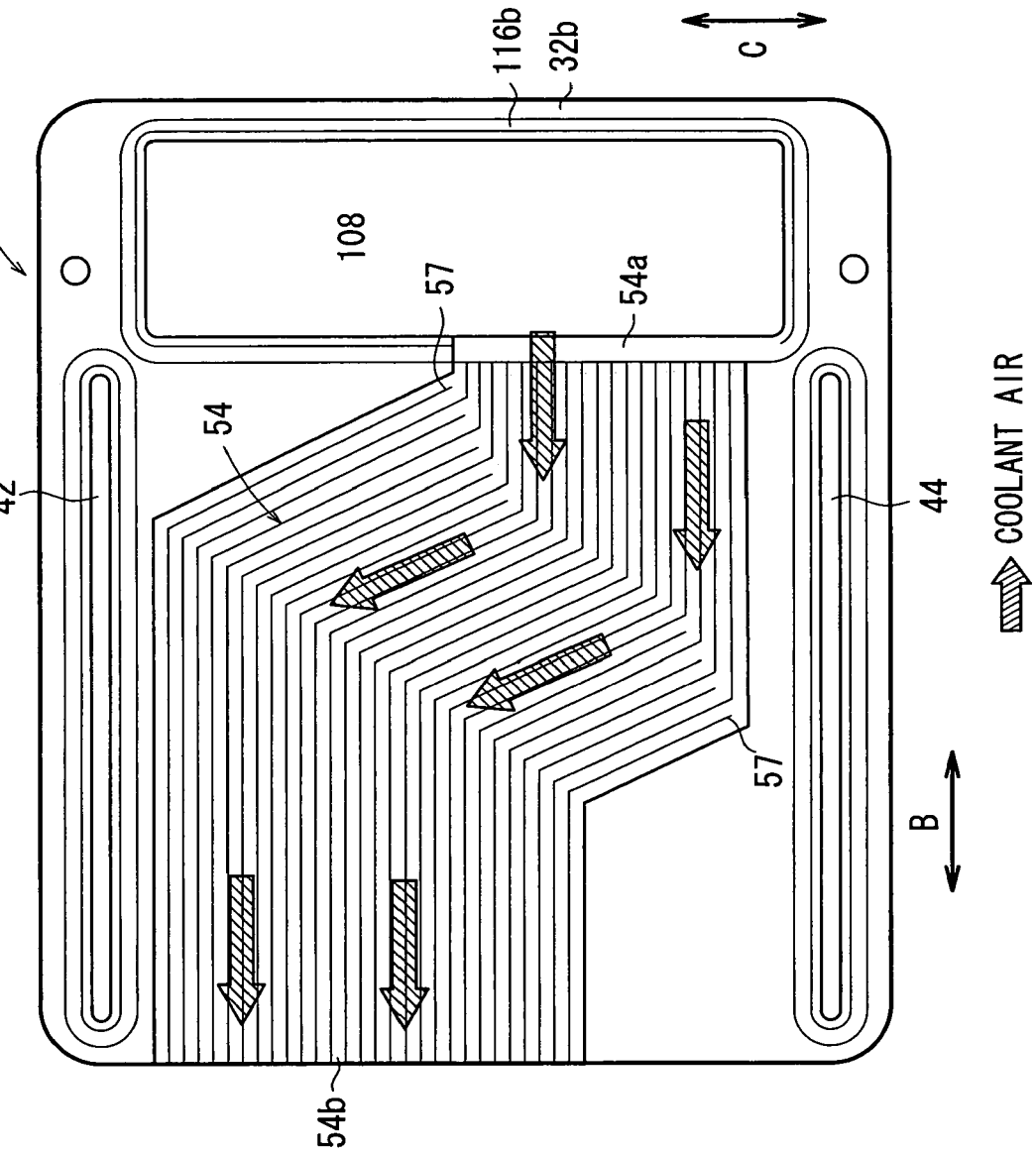
FIG. 14 is a front view showing the other surface of the first separator shown in FIG. 13.
Figure 15:
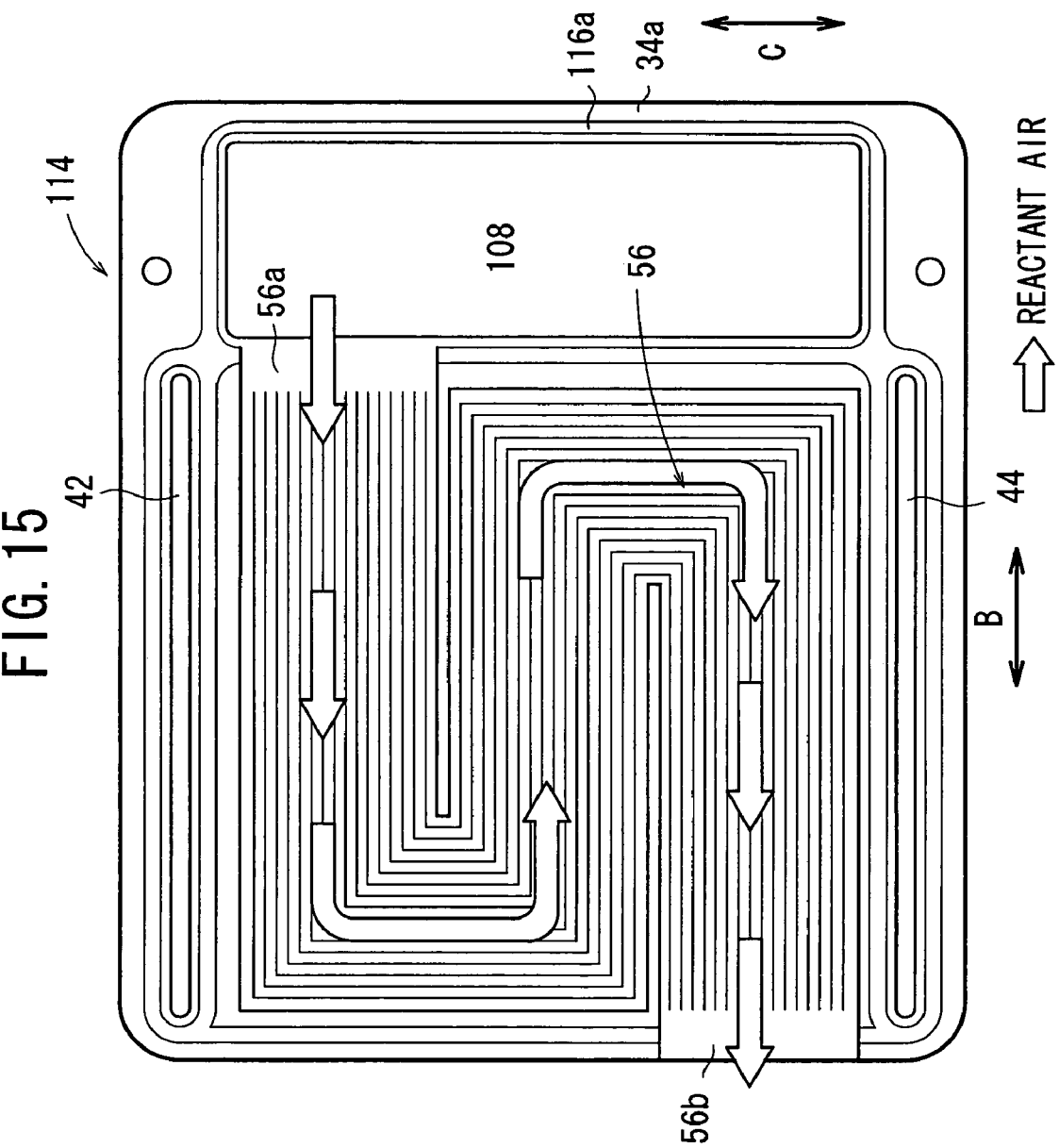
FIG. 15 is a front view showing one surface of a second separator of the fuel cell stack according to the second embodiment.

As shown in FIG. 12, an air supply passage 108 extends through a plurality of power generation cells 16 of the fuel cell stack 100. The air supply passage 108 is connected to the reactant air inlet 56a, and the coolant air inlet 54a of each of the power generation cells 16. The air supply passage 108 has a suitable shape to function as the reactant gas supply passage 38 and the coolant air supply passage 40 (see FIG. 4). As shown in FIGS. 13 through 15, each of the power generation cells includes the membrane electrode assembly 110, and first and second separators 112, 114 sandwiching the membrane electrode assembly 110.

Seal members 116a are provided between the membrane electrode assembly 110 and the first separator 112, and between the membrane electrode assembly 110 and the second separator 114. The seal members 116a are provided around the fluid passages and the electrode surfaces. Further, seal members 116b are provided between the adjacent power generation cells 16. The air supply passage 108 extend through the seal members 116a, 116b.

As described above, in the second embodiment, the fuel cell system 102 including the fuel cell stack 100 is small, and produced or operated at low cost. The electrical energy consumed by the blower 90 is small. The number of auxiliary devices such as the pipes and valves (not shown) can be reduced. The membrane electrode assembly 110, the first and second separators 112, 114, and the seal members 116a, 116b are simple, and the fuel cell stack 10 is small. Consequently, the fuel cell system 12 is simple, and produced or operated at low cost.

EXAMPLE

An example of the fuel cell system 102 including the fuel cell stack 100 according to the second embodiment will be described.

70 power generation cells 16 were stacked to form the fuel cell stack 100. The upper limit value of the pressure of the air supplied by the blower 90 was 0.7 kPa for suppressing the power consumption of the blower 90.

The rated current density in the power generation cell 16 was 0.2 A/cm$^2$, and the electrode surface area was 150 cm$^2$. The required flow rate Vre of the reactant air was calculated by the equation (1), i.e., Vre=0.5 normal l/min.

The theoretical electromotive force generated in the reactions was 1.2 v, the rated current density in the power generation cell 16 was 0.2 A/cm$^2$, the electrode surface area was 150 cm$^2$, and the cell voltage was 0.7 v, specific heat energy was 1007 J/kg×K, the temperature at the coolant air outlet 54b was 333K, the temperature at the coolant air inlet 54a was 293K. The required flow rate Vco of the reactant air was calculated by the equations (2) and (3), i.e., Vco=29 normal l/min.

The blower 90 has the upper limit pressure of 0.7 kPA, the flow rate Vre of the reactant air is 0.5 normal l/min., and the flow rate Vco of the coolant air is 29 normal l/min. Based on these conditions, the cross sectional area Sre of the grooves of the reactant air flow channel 56, the length Lre of the grooves of the reactant air flow channel 56, the number Nre of the grooves of the reactant air flow channel 56, the cross sectional area Sco of the grooves of the coolant air flow channel 54, the length Lco of the grooves of the coolant air flow channel 54, the number Nco of the grooves of the coolant air flow channel 54, are determined such that the pressure loss ΔPre of the reactant air and the pressure loss ΔPco of the coolant air are 0.7 kPa.

In the reactant air flow channel 56 having the cross sectional area of the opening of 0.8 mm$^2$, 21 grooves having the length of 370 mm were required. In the coolant air flow channel 54 having the cross sectional area of the opening of 2.1 mm², 44 grooves having the length of 164 mm were required.

Specifically, the groove of the reactant air flow channel 56 had the width W1 of 1 mm, and the depth D1 of 0.8 mm to have the cross sectional area of 0.8 mm². The grooves were in a serpentine pattern having two turn regions to have the length of 370 mm (see FIG. 3). The groove of the coolant air flow channel 54 had the width W2 of 1 mm, and the depth D2 of 2.1 mm to have the cross sectional area of 2.1 mm² (see FIG. 3).

In the coolant air flow channel 54, both ends of the grooves extend horizontally, and the central portion of the grooves are slanted to achieve the effective cooling performance in the central area which is likely to have a high temperature and achieve the length of 164 mm. The air supply passage 108 is connected to both of the coolant air inlet 54a and the reactant air inlet 56a. Therefore, the number Nco of grooves of the coolant air flow channel 54 depends on the number Nre of the grooves of the reactant air flow channel 56.

The coolant air flow channel 54 includes 34 grooves at the coolant air inlet 54a. Six branches are provided at an upper part in the slanted central portion, and four branches 57 are provided at a lower part in the slanted central portion (see FIG. 6). Thus, the total number of the grooves in the coolant air flow channel 54 is 44.

The flow rate Vre of the reactant air and the flow rate Vco of the coolant air in the fuel cell stack 100, i.e., the total flow rate Vtotal of the air supplied from the blower 90 is calculated as (0.5+29)×70=2065 normal l/min. Thus, it is appreciated that the blower 90 which is capable of supplying the air at the pressure of 0.7 kPa or less, and which achieves the total flow rate Vtotal 2065 normal l/min. can be selected.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell stack formed by tightening a plurality of power generation cells together in a stacking direction, said power generation cells each comprising:
    a membrane electrode assembly including an anode, and a cathode, and a solid polymer electrolyte membrane interposed between said anode and said cathode;
    separators sandwiching said membrane electrode assembly;
    a fuel gas flow channel for supplying a fuel gas to said anode;
    a reactant air flow channel for supplying a reactant air to said cathode;
    a coolant air flow channel for supplying a coolant air to said membrane electrode assembly; and
    a blower for supplying said coolant air to a coolant air inlet and said reactant air to a reactant air inlet,
    wherein said reactant air flow channel includes a groove between said reactant air inlet and a reactant air outlet for supplying said reactant air to flow along a surface of said cathode;
    said coolant air flow channel includes a groove between said coolant air inlet and a coolant air outlet for supplying said coolant air to flow along a surface of one of said separators; and
    wherein said reactant air outlet and said coolant air outlet are positioned at a side portion of the separators, and are directly exposed to the outside.

2. A fuel cell stack according to claim 1, wherein
    a reactant air supply passage and a coolant air supply passage are provided separately;
    said reactant air supply passage extends through said power generation cells in said stacking direction, and is connected to said reactant air inlet;
    said coolant air supply passage are connected to said coolant air inlet; and
    said reactant air supply passage and said coolant air supply passage are connected to a single air supply source.

3. A fuel cell stack according to claim 1, wherein an air supply passage extends through said power generation cells in said stacking direction, and said air supply passage is connected to both of said reactant air inlet and said coolant air inlet.

4. A fuel cell stack according to claim 1, wherein said groove of said reactant air flow channel extends in a serpentine pattern, and oriented downwardly;
    said reactant air outlet of said reactant air flow channel is provided at a lower part of said side portion of said power generation cell such that said reactant air is discharged from said reactant air outlet to the outside; and
    said coolant air outlet of said coolant air channel is provided at an upper part of said side portion of said power generation cell such that said coolant air is discharged from said coolant outlet to the outside.

5. A fuel cell stack according to claim 1, further comprising a plurality of fluid passages formed therethrough that extend in the stacking direction, wherein at least one face of each plate of said plurality of power generation cells is free of the fluid passage.

6. A fuel cell stack according to claim 5, wherein the coolant air and the reactant air are exhausted to an external environment from the coolant air flow channel and the reactant air flow channel, respectively, directly along the side of the power generation cell that is free of the fluid passage.

7. A fuel cell stack according to claim 6, wherein the coolant air and the reactant air are exhausted along the same side of each of said plurality of power generation cells.

\* \* \* \* \*